US012762787B2

(12) United States Patent
Wang et al.

(10) Patent No.: US 12,762,787 B2
(45) Date of Patent: Oct. 13, 2026

(54) METHOD, ELECTRONIC DEVICE, AND COMPUTER PROGRAM PRODUCT FOR GENERATING THREE-DIMENSIONAL IMAGE

(71) Applicant: Dell Products L.P., Round Rock, TX (US)

(72) Inventors: Zijia Wang, Weifang (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 327 days.

(21) Appl. No.: 18/510,122

(22) Filed: Nov. 15, 2023

(65) Prior Publication Data

US 2025/0139876 A1 May 1, 2025

(30) Foreign Application Priority Data

Oct. 27, 2023 (CN) ........................ 202311415453.6

(51) Int. Cl.
*G06T 15/20* (2011.01)
*G06T 19/20* (2011.01)
(Continued)

(52) U.S. Cl.
CPC ............ *G06T 15/205* (2013.01); *G06T 19/20* (2013.01); *G06V 10/7715* (2022.01);
(Continued)

(58) Field of Classification Search
CPC ................... G06T 15/205; G06T 19/20; G06T 2219/2016; G06V 10/7715; G06V 10/774; G06V 10/82
See application file for complete search history.

(56) References Cited

U.S. PATENT DOCUMENTS

2019/0377940 A1* 12/2019 Banerjee .............. G06V 40/103
2021/0286977 A1* 9/2021 Chen ......................... G06T 7/75

OTHER PUBLICATIONS

M. Loper et al., "SMPL: A Skinned Multi-Person Linear Model," ACM Transactions on Graphics, vol. 34, No. 6, Nov. 2015, pp. 248:1-248:16.

(Continued)

*Primary Examiner* — Daniel F Hajnik
*Assistant Examiner* — Jed-Justin Imperial
(74) *Attorney, Agent, or Firm* — Ryan, Mason & Lewis, LLP

(57) ABSTRACT

Embodiments of the present disclosure relate to a method, an electronic device, and a computer program product for generating a three-dimensional image. The method includes: receiving a first image presenting a target object at a first viewing angle, wherein the first image is a two-dimensional image; determining a transformed image of the first image at a target viewing angle, wherein the target viewing angle is the same as or different from the first viewing angle. The method further includes: generating a first representation using a first feature extraction layer corresponding to the first viewing angle in an encoder based on the transformed image; and generating a second image based on the first representation, wherein the second image is a three-dimensional image and presents the target object at the target viewing angle.

20 Claims, 6 Drawing Sheets

(51) Int. Cl.
*G06V 10/77* (2022.01)
*G06V 10/774* (2022.01)
*G06V 10/82* (2022.01)

(52) U.S. Cl.
CPC ............ *G06V 10/774* (2022.01); *G06V 10/82* (2022.01); *G06T 2219/2016* (2013.01)

(56) References Cited

OTHER PUBLICATIONS

H. Kato et al., "Differentiable Rendering: A Survey," arXiv:2006.12057v2, Jul. 31, 2020, 20 pages.
P. Ghirardato et al., "Ambiguity from the Differential Viewpoint," California Institute of Technology, Social Science Working Paper 1130, Apr. 2002, 79 pages.
J. Gu et al., "Recent Advances in Convolutional Neural Networks," arXiv:1512.07108v6, Oct. 19, 2017, 38 pages.
Z. Pan et al., "Recent Progress on Generative Adversarial Networks (GANs): A Survey," IEEE Access, vol. 7, Mar. 14, 2019, pp. 36322-36333.
M. H. Rod, "Group Equivariant Convolutional Neural Networks," Bachelor's project in Mathematics, Norwegian University of Science and Technology, Jun. 2020, 49 pages.
O. Ronneberger et al., "U-Net: Convolutional Networks for Biomedical Image Segmentation," arXiv:1505.04597v1, May 18, 2015, 8 pages.
Y. Qu et al., "Enhanced Pix2pix Dehazing Network," IEEE/CVF Conference on Computer Vision and Pattern Recognition (CVPR), Jun. 2019, pp. 8160-8168.
A. Almahairi et al., "Augmented CycleGAN: Learning Many-to-Many Mappings from Unpaired Data," Proceedings of the 35th International Conference on Machine Learning, Jul. 2018, 10 pages.
D. Wang et al., "A General Theory of Correct, Incorrect, and Extrinsic Equivariance," arXiv:2303.04745v1, Mar. 8, 2023, 17 pages.
C. Esteves, "Theoretical Aspects of Group Equivariant Neural Networks," arXiv:2004.05154v2, Apr. 30, 2020, 39 pages.
M. G. Bergomi et al, "Towards a Topological-geometrical Theory of Group Equivariant Non-expansive Operators for Data Analysis and Machine Learning," arXiv:1812.11832v3, Mar. 3, 2019, 42 pages.

* cited by examiner

METHOD, ELECTRONIC DEVICE, AND COMPUTER PROGRAM PRODUCT FOR GENERATING THREE-DIMENSIONAL IMAGE

RELATED APPLICATION

The present application claims priority to Chinese Patent Application No. 202311415453.6, filed Oct. 27, 2023, and entitled “Method, Electronic Device, and Computer Program Product for Generating Three-Dimensional Image,” which is incorporated by reference herein in its entirety.

FIELD

Embodiments of the present disclosure relate to the field of computers, and more particularly, to a method, an electronic device, and a computer program product for generating an image.

BACKGROUND

With the ongoing development of science and technology, it has become possible to render a three-dimensional (3D) image based on a two-dimensional (2D) image, and such 3D image renderings have many applications. For example, human body rendering has a variety of applications such as virtual try-on, personalized shopping, and virtual reality. Human body rendering is a challenging issue that has attracted extensive attention in the fields of computer vision and graphics. Its purpose is to synthesize images and/or videos of real humans with controlled appearances, poses, expressions, etc.

SUMMARY

Embodiments of the present disclosure provide a method, an electronic device, and a computer program product for generating a 3D image.

According to a first aspect of the present disclosure, a method for generating a 3D image is provided. The method includes receiving a first image presenting a target object at a first viewing angle, wherein the first image is a 2D image. The method further includes determining a transformed image of the first image at a target viewing angle, wherein the target viewing angle is the same as or different from the first viewing angle. The method further includes generating a first representation using a first feature extraction layer corresponding to the first viewing angle in an encoder based on the transformed image. The method further includes generating a second image based on the first representation, wherein the second image is a 3D image and presents the target object at the target viewing angle.

According to a second aspect of the present disclosure, an electronic device is provided. The electronic device includes a processor and a memory coupled to the processor and having instructions stored therein, wherein the instructions, when executed by the processor, cause the electronic device to perform actions. The actions include receiving a first image presenting a target object at a first viewing angle, wherein the first image is a 2D image. The actions further include determining a transformed image of the first image at a target viewing angle, wherein the target viewing angle is the same as or different from the first viewing angle. The actions further include generating a first representation using a first feature extraction layer corresponding to the first viewing angle in an encoder based on the transformed image. The actions further include generating a second image based on the first representation, wherein the second image is a 3D image and presents the target object at the target viewing angle.

According to a third aspect of the present disclosure, a computer program product is provided. The computer program product is tangibly stored on a non-transitory computer-readable medium and includes computer-executable instructions. The computer-executable instructions, when executed by a device, cause the device to execute the method according to the first aspect.

This Summary is provided to introduce the selection of concepts in a simplified form, which will be further described in the Detailed Description below. The Summary is neither intended to identify key features or principal features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

In all the accompanying drawings, identical or similar reference numerals indicate identical or similar elements.

DETAILED DESCRIPTION

Figure 1:
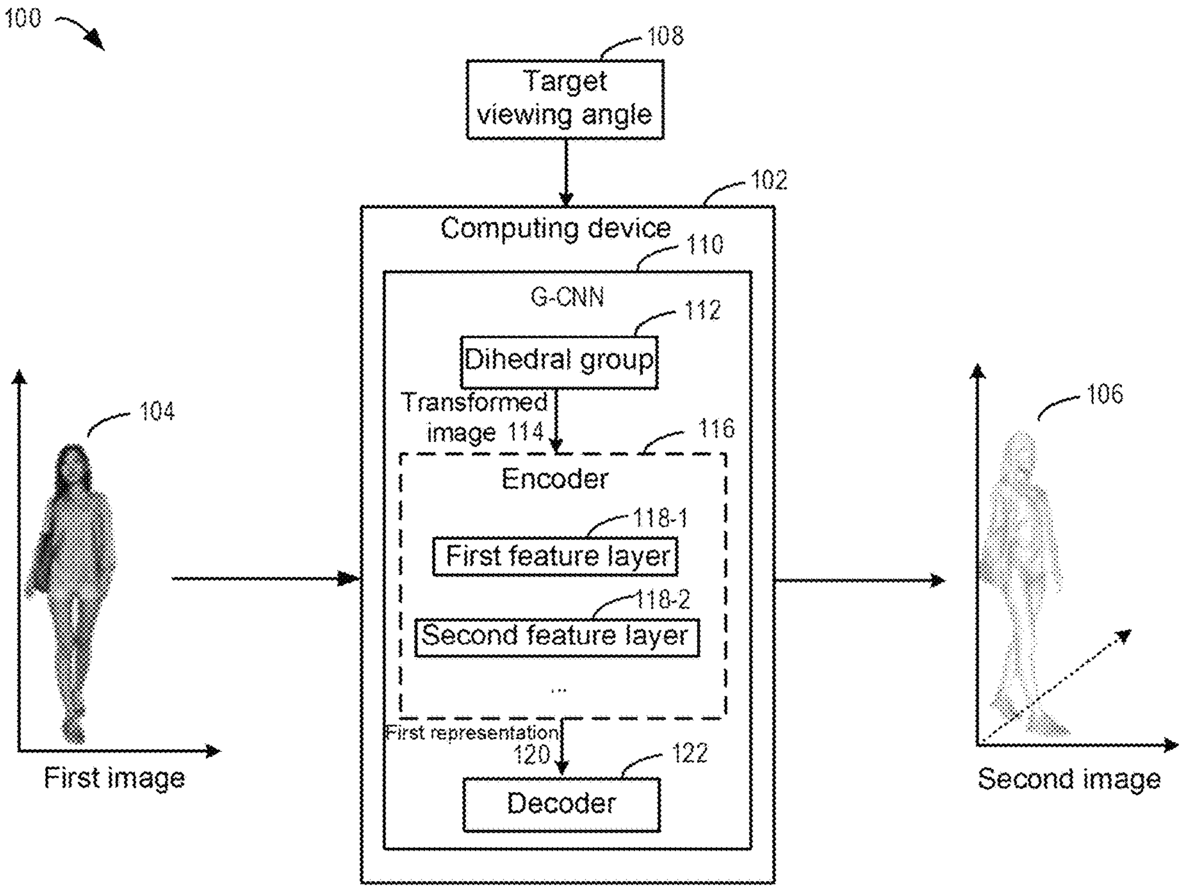
FIG. 1 is a schematic diagram of an example environment in which an embodiment of the present disclosure can be implemented.

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the scope of protection of the present disclosure.

In the description of illustrative embodiments of the present disclosure, the term “include” and similar terms thereof should be understood as open-ended inclusion, i.e., “include but not limited to.” The term “based on” should be understood as "based at least in part on." The term "one embodiment" or "the embodiment" should be understood as "at least one embodiment." The terms "first," "second," and the like may refer to different or identical objects. Other explicit and implicit definitions may also be included below. Additionally, all specific numerical values herein are examples, which are provided only to aid in understanding, and are not intended to limit the scope.

As discussed in the Background above, the purpose of human body rendering is to synthesize images and/or videos of real humans with controlled appearances, poses, expressions, etc. Conventional human body rendering methods can be roughly divided into two categories: model-based methods and model-free methods. Among them, the model-based methods rely on a predefined 3D human body model, e.g., a skinned multi-person linear (SMPL) model, to represent a human body shape and a pose. The SMPL model typically estimates 3D human body parameters from an input image or video, and then performs rendering using a differentiable renderer. The model-based methods may achieve high-quality results, but they also have some limitations. For example, they may encounter problems such as blurred viewing angle, limited expressive capability, and high computational cost.

The model-free methods do not use any predefined 3D body model, but instead directly learn the mapping from an input image or video to an output image or video with a required viewing angle or appearance. The model-free methods typically employ a deep neural network, e.g., a convolutional neural network (CNN) or a generative adversarial network (GAN), to learn such a mapping in an end-to-end manner. The model-free methods can avoid some of the limitations of the model-based methods, but also face some challenges. For example, they may require a large amount of training data, lack geometric consistency, and produce artifacts or distortions.

It can be seen that human body rendering is also a challenging issue due to high complexity and variability of human body appearance and motion. For example, one of the challenges for human body rendering is to handle changes in viewing angle, such as a task of how to generate images or videos of a person from different viewing angles given an input image or video of the same person at a given viewing angle. This task not only requires capturing a 3D structure and appearance of the human body from a single viewing angle, but also requires transferring them to images from other viewing angles in a consistent and real way.

Another challenge for human rendering is to handle data scarcity. Collecting large-scale datasets with real 3D human body structures or images from multiple viewing angles is expensive and time-consuming. In addition, such datasets may not cover all possible variations in human appearance and motion in different scenarios. Therefore, there is a need for a method that can learn from limited or noisy data and can be well generalized to unseen situations.

In order to address these and other disadvantages, an embodiment of the present disclosure provides a solution for generating a 3D image. This solution includes an equivariant learning framework that can address one or more of the challenges described above. This solution predicts images from multiple viewing angles from a single 2D image in a training stage, and generates a 3D image from the single 2D image in an inference stage. In some embodiments, for human body rendering, the present solution does not rely on any predefined 3D human body model or real 3D human body structure or images from multiple viewing angles. Instead, it learns invariant and equivariant representations of human body rendering using a group-equivariant convolutional neural network (G-CNN) and self-supervised learning.

For example, the present solution encodes a 2D image at a single viewing angle using a G-CNN to generate a 3D image. The G-CNN is intended to take advantage of the symmetry of data and reduce sample complexity by sharing weights between different conversions, so it can generate a 3D image at a target viewing angle more quickly and accurately based on a 2D image, thus saving time and computing resources.

In some embodiments, the present solution expresses the problem of converting a 2D image into a 3D image as an equivariant learning task, in which learning is sought for representations invariant to the input viewing angle and equivariant to the output viewing angle. In this way, it is possible to predict images of an object from multiple viewing angles from a single input image in the training stage, and generate a 3D image from the single input image in the inference stage. In some embodiments, the present solution implements an equivariance constraint between images from different viewing angles during training using a self-supervised loss function. In this way, the G-CNN can be trained without any real 3D human body structure or images from multiple viewing angles. In some embodiments, the present solution uses a differentiable renderer to project a 3D structure onto a 2D image in an inference process. In this way, realistic 3D images with consistent geometry and appearance can be generated in images from different viewing angles.

FIG. 1 is a schematic diagram of an example environment 100 in which an embodiment of the present disclosure can be implemented. As shown in FIG. 1, the example environment 100 may include a computing device 102. The computing device 102 may be, for example, a computing system or a server. An application or software that executes an embodiment of the present disclosure for generating a 3D image may be installed on the computing device 102. The computing device 102 receives as an input an image 104 (which may also be referred to as a first image herein), wherein the image 104 is a 2D image and includes a target object, e.g., a human body, presented at an original viewing angle (also referred to as a first viewing angle). It is to be understood that although the present disclosure uses the human body as an example to describe the present solution, the present solution may also be applied to the generation of 3D images of other objects.

A user may further input a target viewing angle 108 to the computing device 102. The target viewing angle 108 represents an angle from which the user expects to see the target object. For example, it is possible to take a north direction as 0 degrees and a clockwise rotated angle as the target viewing angle, i.e., 90 degrees represents due east, 180 degrees represents due south, and 270 degrees represents due west.

The image 104 may be input to a G-CNN model 110. In the G-CNN model 110, a dihedral group 112 may be included. The dihedral group 112 may include eight transformations: four rotations (0°, 90°, 180°, and 270°) and four reflections (horizontal, vertical, and two diagonals). These transformations convert an object in the image 104 from the original viewing angle to a different viewing angle to obtain one or more images 114 (also referred to as transformed images) of the same object from different viewing angles. The one or more images 114 may be input to a shared encoder 116 of the G-CNN model 110. The encoder 116 generates eight feature graphs of the same size and dimensionality. These feature graphs are invariant to the input image 104 and equivariant to an output image.

In some examples, the encoder 116 may include a feature extraction layer specific to a viewing angle, e.g., a feature layer 118-1 (also referred to as a first feature layer) and a feature layer 118-2 (also referred to as a second feature layer), as well as one or more additional feature layers not explicitly shown (which may also be collectively or individually referred to as a feature layer or a feature extraction layer). As an example, the feature extraction layer 118-1 may be specific to a viewing angle of 0 degrees, the feature extraction layer 118-2 may be specific to a viewing angle of 90 degrees, and so on. The feature extraction layer may be one or more layers of a CNN, which may better extract features of an object in an image from a specific viewing angle. The encoder 116 may generate a representation 120 (also referred to as a first representation 120) based on the image 114. The representation 120 may be decoded by a decoder 122 to generate an image 106. The image 106 is a 3D image and presents the target object at the target viewing angle 108.

It should be understood that the above description of the architecture and functionality in the example environment 100 is for illustrative purposes only and does not imply any limitations to the scope of the present disclosure. Embodiments of the present disclosures may also be applied to other environments with different structures and/or functions.

Figure 2:
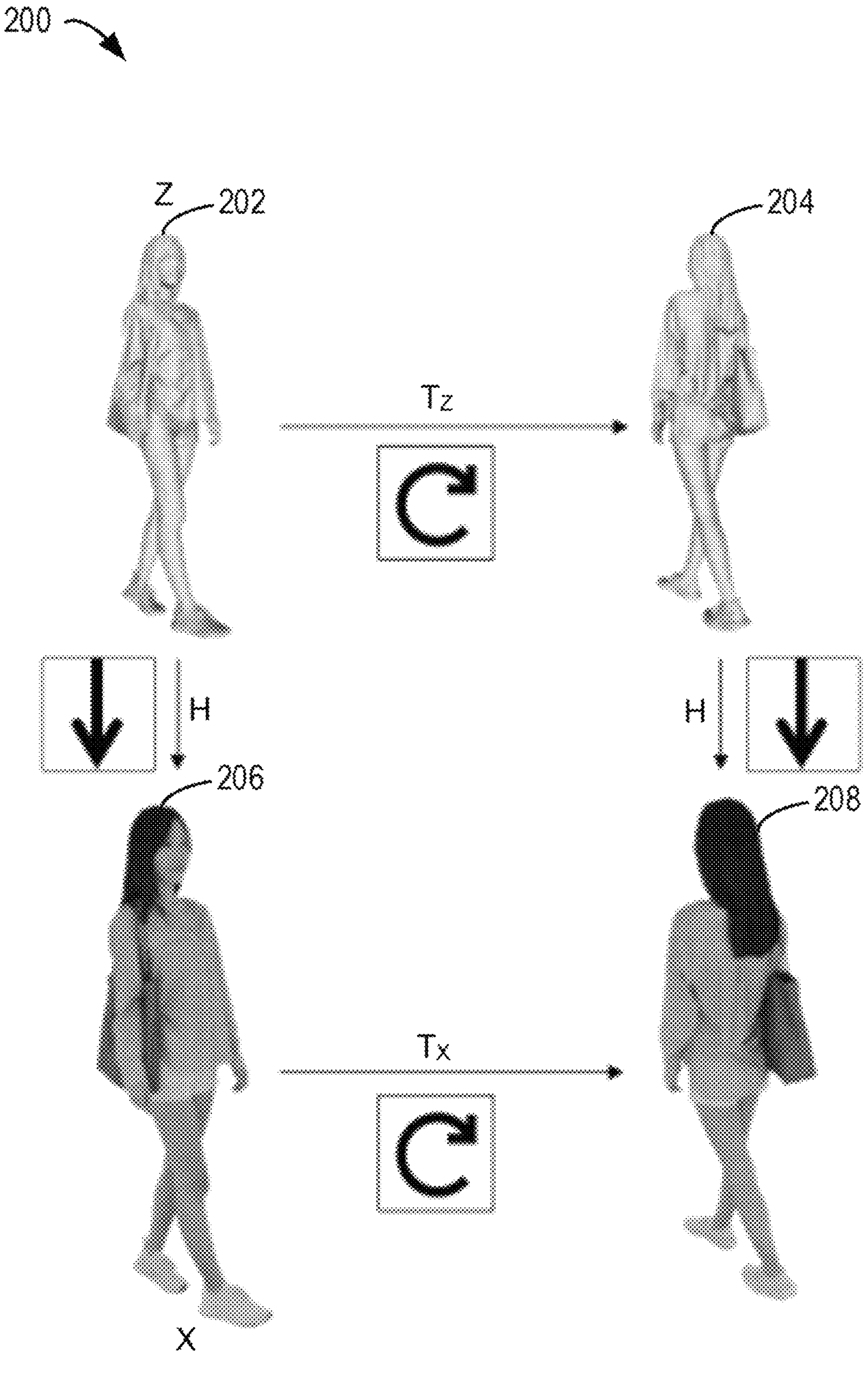
FIG. 2 is a schematic diagram of a process for generating a 3D image according to an example embodiment of the present disclosure.

FIG. 2 is a schematic diagram of a process 200 for generating a 3D image according to an example embodiment of the present disclosure. The present disclosure expresses the problem of image generation from 2D to 3D as an equivariant learning task, in which the present disclosure seeks to learn a representation invariant to an input image and equivariant to an output image. Specifically, it is possible to train a deep neural network and predict a 3D image from a single input image using equivariance constraint and a self-supervised learning strategy, with advantages in accuracy, robustness, and efficiency.

In some embodiments, a framework of the present solution includes three main components: an encoder network, a decoder network, and a loss function. The encoder network acquires an input image of an object and extracts a potential representation that is invariant to the input image. The decoder network takes the potential representation and an output image as an input and generates a 3D image equivalent to the output image. The loss function measures a difference between a predicted 3D image and a real 3D image.

The framework utilizes two key ideas: equivariance constraint and self-supervised learning. The equivariance constraint enforces that a change in the output image should result in a corresponding change in the predicted 3D image. The self-supervised learning utilizes multiple images of the same object with different points of view as supervision signals for training.

As an example, it is possible to convert an original image 202 from a 0-degree viewing angle to an image 204 at a 180-degree viewing angle before generation of a corresponding 3D image 208. It is also possible to convert an original image 202 at a 0-degree viewing angle to a 3D image 206 at a 0-degree viewing angle before generation of a corresponding 3D image 208. These two approaches are equivalent.

A process according to an embodiment of the present disclosure will be described in detail below with reference to FIG. 3 to FIG. 5. For the convenience of understanding, specific data mentioned in the following description is illustrative and is not intended to limit the protection scope of the present disclosure. It should be understood that embodiments described below may also include additional actions not shown and/or may omit actions shown, and the scope of the present disclosure is not limited in this regard.

Figure 3:
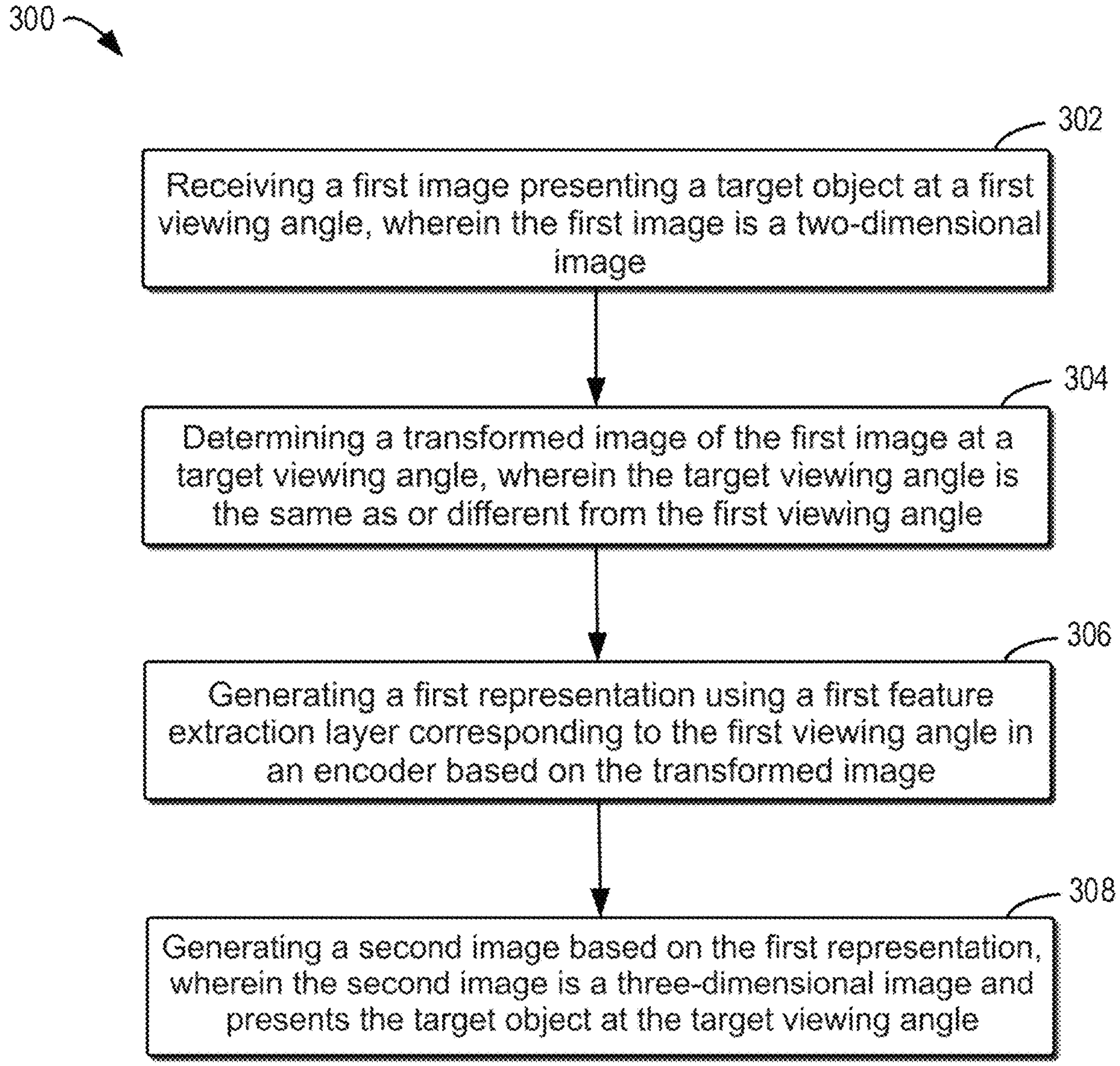
FIG. 3 is a flow chart of a method for generating a 3D image according to an example embodiment of the present disclosure.

FIG. 3 is a flow chart of a method 300 for generating a 3D image according to an example embodiment of the present disclosure. At block 302, a first image presenting a target object at a first viewing angle is received, wherein the first image is a 2D image. For example, the computing device 102 receives the image 104, wherein the target object in the image 104 is a human body and is presented at a 0-degree viewing angle.

At block 304, a transformed image of the first image at a target viewing angle is determined, wherein the target viewing angle is the same as or different from the first viewing angle. For example, the computing device 102 determines the transformed image 114 of the image 104 at the target viewing angle 108. The transformed image 114, for example, rotates the image 104 clockwise by 90 degrees.

In some embodiments, a plurality of transformed images may be generated based on the first image and with a dihedral group, such as the dihedral group 112, wherein the dihedral group includes rotation transformations at a plurality of angles and reflection transformations at a plurality of angles.

In some embodiments, the rotation transformations at the plurality of angles include a plurality of rotation transformations that rotate the target object at different angles, respectively, and the reflection transformations at the plurality of angles include a plurality of reflection transformations that reflect the target object in different directions, respectively. For example, the dihedral group 112 may include eight transformations: four rotations (0°, 90°, 180°, and 270°) and four reflections (horizontal, vertical, and two diagonals). It is possible to determine a plurality of weights corresponding to the plurality of transformed images based on the target viewing angle, and determine the transformed image based on the plurality of transformed images and the plurality of weights. For example, the weights corresponding to the four rotations are r1, r2, r3, and r4, respectively, and the weights corresponding to the four reflections are r5, r6, r7, and r8, respectively. One transformed image may be synthesized based on these weights. It is to be understood that it is not necessary to use all the eight transformations every time, but instead which of them to use may be determined depending on the original viewing angle and the target viewing angle.

At block 306, a first representation is generated using a first feature extraction layer corresponding to the first viewing angle in an encoder based on the transformed image. As an example, the computing device 102 generates the representation 120 based on the transformed image 114 using the feature layer 118-1 (assuming that it is specific to a 0-degree viewing angle) in the encoder 116.

In some embodiments, the encoder further includes a second feature extraction layer corresponding to a second viewing angle, a third feature extraction layer corresponding to a third viewing angle, and a fourth feature extraction layer corresponding to a fourth viewing angle, wherein the first viewing angle, the second viewing angle, the third viewing angle, and the fourth viewing angle are different from one another. For example, the first viewing angle is 0 degrees, the second viewing angle is 90 degrees, the third viewing angle is 180 degrees, and the fourth viewing angle is 270 degrees.

In some embodiments, it is possible to generate a second representation based on the first image and with the second feature extraction layer, to generate a third representation based on the first image and with the third feature extraction layer, to generate a fourth representation based on the first image and with the fourth feature extraction layer, and/or to generate a fifth representation based on the first representation, the second representation, the third representation, and the fourth representation. In this way, the fifth representation merges more feature information, and the feature information may be cross-referenced and corrected to more accurately generate a 3D image at the target viewing angle.

At block 308, a second image is generated based on the first representation, wherein the second image is a 3D image and presents the target object at the target viewing angle. As an example, the computing device 102 generates the image 106 based on the representation 120, wherein the image 106 is a 3D image and presents the human body at 90 degrees. In some embodiments, the image 106 may be generated based on the fifth representation.

By implementing the embodiment provided by the method 300, leading results may be obtained on various benchmark datasets with less data and fewer computational resources than conventional methods, and the 3D image at the target viewing angle can be generated more quickly and accurately based on the 2D image, thus saving time and computing resources.

In some embodiments, the encoder is part of a G-CNN obtained via pre-training, and the first feature extraction layer, the second feature extraction layer, the third feature extraction layer, and the fourth feature extraction layer are respectively at least one layer in the G-CNN.

Figure 4:
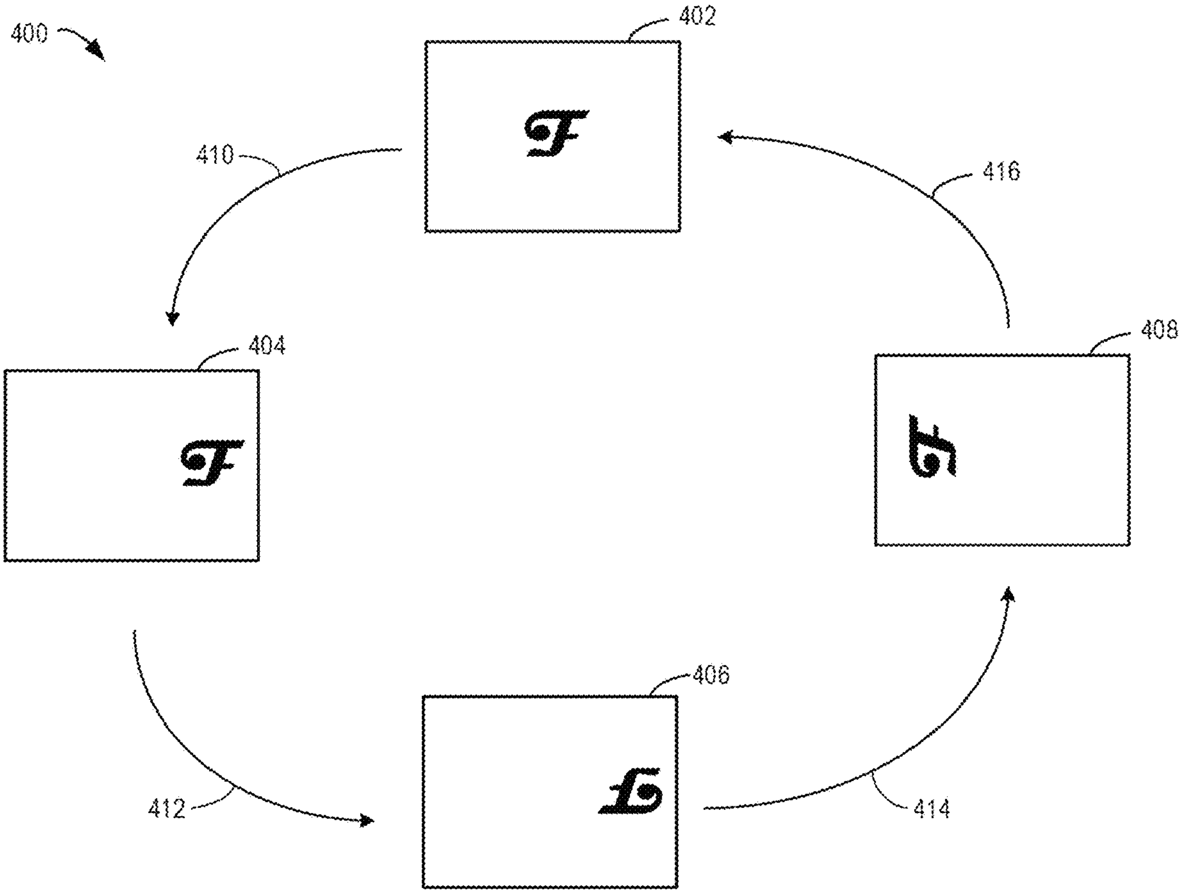
FIG. 4 is a schematic diagram of a workflow of a group-equivariant convolutional neural network (G-CNN) according to an example embodiment of the present disclosure.
Figure 5:
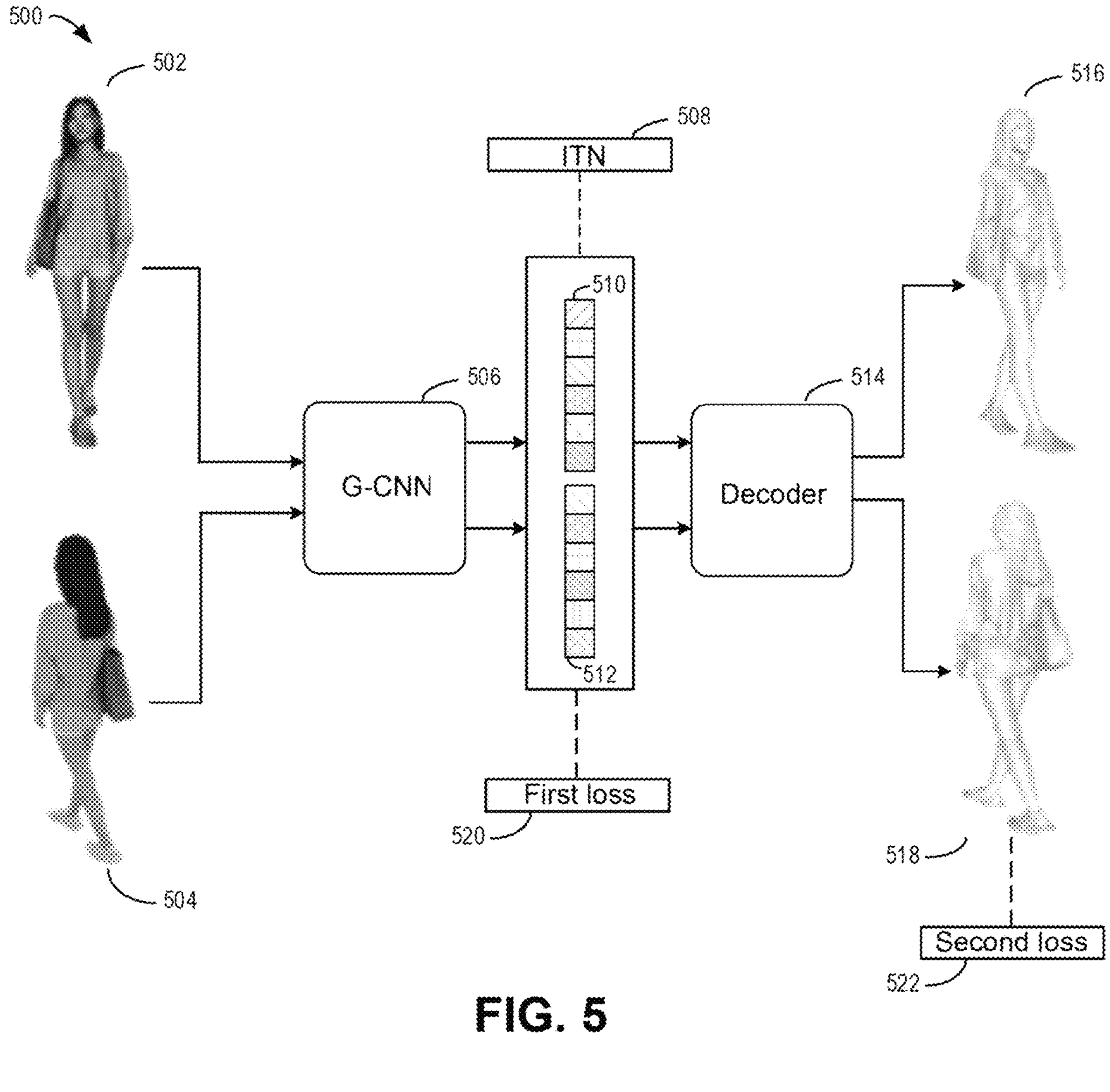
FIG. 5 is a schematic diagram of a framework of training a G-CNN according to an example embodiment of the present disclosure.

The G-CNN of the present disclosure will now be understood with reference to FIG. 4. FIG. 4 is a schematic diagram of a workflow 400 of a G-CNN according to an example embodiment of the present disclosure. The G-CNN is a type of a CNN and is equivariant under specific transformations (rotation, translation, reflection, etc.). In other words, a result obtained by transforming an image and then feeding it into a convolutional layer is the same as that obtained by directly feeding the original image into the same convolutional layer to obtain a feature graph and then transforming the feature graph.

As an example, images 402, 404, 406, and 408 in FIG. 4 show the effects of some possible transformations. For example, assuming the original image is the image 402 and a target object therein is a script letter F arranged in the image 402 as shown, a transformation 410 results in translation of the target object to the right to obtain the image 404. A transformation 412 results in rotation of the target object by 180 degrees to obtain the image 406. A transformation 414 results in rotation of the target object clockwise by 90 degrees and translation of the target object to the left to obtain the image 408. A transformation 416 results in translation of the target object to the right and rotation of the target object clockwise by 90 degrees to obtain the image 402. The operational effect of these transformations 410-416 on the original image 402 is equivalent to the re-transformation of the feature graph (also referred to as a representation) obtained after the original image 402 passes through the feature extraction layer of a CNN.

In order to better understand the G-CNN of the present solution, a process of training the G-CNN will be described below in conjunction with FIG. 5. FIG. 5 is a schematic diagram of a framework 500 of training a G-CNN 506 according to an example embodiment of the present disclosure. The G-CNN 506 is a type of CNN, and it takes advantage of the symmetry of data and reduces sample complexity by sharing weights between different transformations. For example, the G-CNN 506 may be defined as a CNN meeting the following attributes: for any input x and any transformation g in group G, if it is applied before the G-CNN, the output of the G-CNN is invariant to g, and it is equivalent for g if applied after the G-CNN. This arrangement can be expressed as shown in Equation (1):

$$f(gx) = gf(x),\ \forall\, x \in X,\ g \in G \tag{1}$$

where f denotes the operation of the G-CNN, X denotes an input space, and G denotes a transformation group.

In some embodiments, e.g., for human body rendering, the G-CNN may be used to encode images of a human from multiple viewing angles from images from a single viewing angle. Specifically, a dihedral group (e.g., dihedral group D4) may be used, as mentioned above. These transformations may be applied to an input image (e.g., an image 502 or an image 504) of a human viewed from an angle, and eight images of the same person may be obtained from different angles. These images may then be input to a shared G-CNN encoder, which generates eight feature graphs of the same size and dimensionality (e.g., a representation 510 and a representation 512). These feature graphs are invariant to an input image and equivariant to an output image (e.g., an image 516 and an image 518).

The advantage of using the G-CNN encoder is that it may capture more information about the 3D structure and appearance of a human body from a single image than a conventional CNN encoder does. In addition, it may reduce the quantity of parameters and improve generalization capability by sharing weights between different transformations.

In some embodiments, in order to train the G-CNN encoder without any real 3D body structure or images from multiple viewing angles, a self-supervised loss function may be used to enforce an equivariant constraint between the images from different viewing angles during training. The self-supervised loss function includes two terms: an equivariance loss term 520 (also referred to as a first loss) and a perceptual loss term 522 (also referred to as a second loss).

The equivariance loss term measures a degree to which the G-CNN encoder reserves relative transformations between images from different viewing angles. For example, if the input image is rotated clockwise by 90 degrees and then input to the G-CNN encoder, it is expected that its corresponding feature graph will also be rotated clockwise by 90 degrees relative to its original feature graph. To calculate this loss, a secondary network referred to as an inverse transformation network 508 (ITN) may be used, and it takes two feature graphs as an input and predicts their relative transformations in terms of rotation angles or reflection axes. The ITN may be jointly trained with the G-CNN encoder, using a feature graph pair with known relative transformations as supervision. The equivariance loss term may be defined as shown in Equation (2):

$$L_{eq} = \sum_{i,j=1}^{8} \lvert g_{ij} - ITN(f(x_i), f(x_j)) \rvert_2^2 \tag{2}$$

where $x_i$ and $x_j$ are two images obtained by applying different transformations of the dihedral group D4 to the input image; $f(x_i)$ and $f(x_j)$ are corresponding feature graphs generated by the G-CNN encoder; $g_{ij}$ is their true relative transformation; and $$\|\cdot\|_2^2$$

denotes a squared Euclidean distance.

The perceptual loss term measures a matching degree of the generated image and its real image in terms of appearance similarity. To generate an image from the feature graph, another secondary network referred to as a differentiable renderer may be used, and an input to the differentiable renderer may be: (1) a feature graph generated by the G-CNN encoder; (2) a desired viewing angle; and (3) a background image. The differentiable renderer outputs one image with consistent geometry and appearance at different view angles. The differentiable renderer may be trained in conjunction with the G-CNN encoder, using a feature graph pair and a real image as supervision. The perpetual loss term may be defined as shown in Equation (3):

$$L_{per} = \sum_{i=1}^{8} |R(f(x_i), v_i, b) - y_i|_1 \quad (3)$$

where R is the differentiable renderer; $f(x_i)$ is a feature graph generated by the G-CNN encoder for the image $x_i$; $v_i$ is a viewing angle required for the image $y_i$; b is a background image; and $|\bullet|_1$ denotes an L1 distance.

A total loss function (also referred to as a third loss function) of a training framework of the present solution may be expressed as shown in Equation (4):

$$L = L_{eq} + \lambda L_{per} \quad (4)$$

where $\lambda$ is a trade-off parameter to balance the equivariance loss and the perceptual loss.

In some embodiments, a stochastic gradient descent (SGD) with momentum may be used to optimize the G-CNN encoder and the secondary networks. For example, a learning rate of 0.01, a momentum of 0.9, and a batch size of 32 are used.

In some embodiments, a decoder 514 may be a deconvolutional neural network (DeCNN) that takes a potential representation and an output image as an input and outputs a 3D image with a size H×W×3. The output image is represented by a rotation matrix R with a size of 3×3, which specifies a desired direction of the structure of an object in 3D. The decoder ensures that the structure of a target object in an output 3D image is equivalent to the output image, which means that it changes accordingly when the output image is rotated or translated.

In this way, the G-CNN obtained by training with the framework 500 may reduce the complexity of samples required for training. Equivariant learning may be used, the symmetry of samples may be used, and unseen viewing angles may be learned and better summarized from less data. In some embodiments, model complexity is also reduced, and the equivariant learning may reduce the quantity of parameters and the amount of computations required to share weights between images from different viewing angles. In some embodiments, the interpretability is improved, and the equivariant learning may provide a more intuitive and meaningful data representation while reserving its geometry.

In addition, the present solution further utilizes self-supervised learning for 3D human body structure prediction. The self-supervised learning is a powerful technique that may learn useful features from unlabeled data by designing pretext tasks. In this case, it is possible to use the equivariance constraint to predict, from an image from a single viewing angle, images from multiple viewing angles. This enables the solution to use a large amount of unlabeled data for training and improve its performance without expensive 3D annotations.

Figure 6:
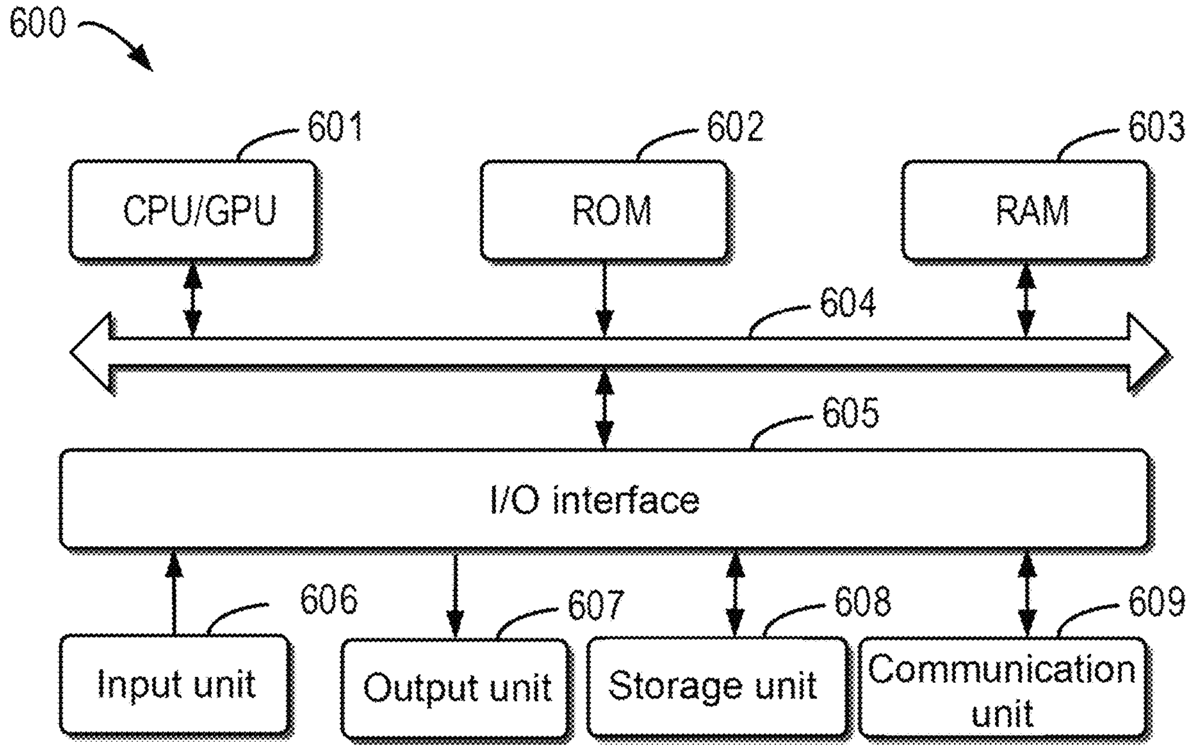
FIG. 6 is a block diagram of a device for generating a 3D image according to an example embodiment of the present disclosure.

FIG. 6 shows a block diagram of a device 600 that may be used to implement an embodiment of the present disclosure. The device 600 may be a device or apparatus as described in an embodiment of the present disclosure. As shown in FIG. 6, the device 600 includes a central processing unit and/or graphics processing unit (CPU/GPU) 601 that may perform various appropriate actions and processing according to computer program instructions stored in a read-only memory (ROM) 602 or computer program instructions loaded from a storage unit 608 into a random access memory (RAM) 603. Various programs and data required for the operation of the device 600 may also be stored in the RAM 603. The CPU/GPU 601, the ROM 602, and the RAM 603 are connected to one another through a bus 604. An input/output (I/O) interface 605 is also connected to the bus 604. Although not shown in FIG. 6, the device 600 may also include a co-processor.

A plurality of components in the device 600 are connected to the I/O interface 605, including: an input unit 606, e.g., a keyboard, a mouse etc.; an output unit 607, e.g., various types of displays, speakers, etc.; a storage unit 608, e.g., a magnetic disk, an optical disc, etc.; and a communication unit 609, e.g., a network card, a modem, a wireless communication transceiver, etc. The communication unit 609 allows the device 600 to exchange information/data with other devices via a computer network, such as the Internet, and/or various telecommunication networks.

The various methods and processes described above may be executed by the CPU/GPU 601. For example, in some embodiments, the method 300 and/or other methods and processes may be implemented as a computer software program that is tangibly contained in a machine-readable medium, e.g., the storage unit 608. In some embodiments, part of or all the computer program may be loaded and/or installed onto the device 600 via the ROM 602 and/or the communication unit 609. When the computer program is loaded into the RAM 603 and executed by the CPU/GPU 601, one or more steps or actions of the method 300 and/or other methods and processes described above may be executed.

In some embodiments, the methods and processes described above may be implemented as a computer program product. The computer program product may include a computer-readable storage medium on which computer-readable program instructions for executing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings display the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two successive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a special-purpose hardware-based system that executes specified functions or actions, or using a combination of special-purpose hardware and computer instructions.

Various embodiments of the present disclosure have been described above. The foregoing description is illustrative rather than exhaustive, and is not limited to the embodiments disclosed. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the various embodiments disclosed herein.

What is claimed is:

1. A method for generating a three-dimensional image, comprising:

receiving a first image presenting a target object at a first viewing angle, wherein the first image is a two-dimensional image;

determining a transformed image of the first image at a target viewing angle, wherein the target viewing angle is the same as or different from the first viewing angle, wherein determining the transformed image of the first image at the target viewing angle comprises generating a plurality of transformed images based on the first image utilizing a transformation group comprising a dihedral group, the dihedral group including rotation transformations at a plurality of angles and reflection transformations at a plurality of angles, the transformed image of the first image being determined based on the plurality of transformed images generated utilizing the transformation group comprising the dihedral group;

generating a first representation using a first feature extraction layer corresponding to the first viewing angle in an encoder based on the transformed image; and generating a second image based on the first representation, wherein the second image is a three-dimensional image and presents the target object at the target viewing angle.

2. The method according to claim 1, wherein determining the transformed image of the first image further comprises:

determining a plurality of weights corresponding to the plurality of transformed images based on the target viewing angle; and determining the transformed image based on the plurality of transformed images and the plurality of weights.

3. The method according to claim 1, wherein the rotation transformations at the plurality of angles comprise a plurality of rotation transformations that rotate the target object at different angles, respectively, and the reflection transformations at the plurality of angles comprise a plurality of reflection transformations that reflect the target object in different directions, respectively.

4. The method according to claim 1, wherein the encoder further comprises a second feature extraction layer corresponding to a second viewing angle, a third feature extraction layer corresponding to a third viewing angle, and a fourth feature extraction layer corresponding to a fourth viewing angle, wherein the first viewing angle, the second viewing angle, the third viewing angle, and the fourth viewing angle are different from one another.

5. The method according to claim 4, the method further comprising:

generating a second representation based on the first image and with the second feature extraction layer;

generating a third representation based on the first image and with the third feature extraction layer;

generating a fourth representation based on the first image and with the fourth feature extraction layer; and generating a fifth representation based on the first representation, the second representation, the third representation, and the fourth representation, and wherein generating the second image based on the first representation comprises:

generating the second image based on the fifth representation.

6. The method according to claim 5, wherein the encoder is part of a group-equivariant convolutional neural network obtained via pre-training, and the first feature extraction layer, the second feature extraction layer, the third feature extraction layer, and the fourth feature extraction layer are respectively at least one layer in the group-equivariant convolutional neural network.

7. The method according to claim 6, wherein the pre-training comprises:

determining, based on a set of sample two-dimensional images, a first loss function corresponding to the set of sample two-dimensional images with an inverse transformation network, wherein the first loss function represents a degree to which the encoder reserves relative transformations between multiple images at different viewing angles; and determining, based on the set of sample two-dimensional images, a second loss function corresponding to the set of sample two-dimensional images with a differentiable renderer, and the second loss function represents a matching degree of a generated plurality of training three-dimensional images and a plurality of reference three-dimensional images in terms of appearance similarity.

8. The method according to claim 7, wherein the first loss function comprises a set of distances between respective ones of:

a plurality of training transformed images generated by the inverse transformation network and based on a plurality of representations determined by a feature extraction layer corresponding to a plurality of sample transformed images in the encoder; and a plurality of reference transformed images.

9. The method according to claim 7, wherein the second loss function comprises a set of distances between respective ones of:

a plurality of training three-dimensional images generated by the differentiable renderer and based on a plurality of representations generated by a feature extraction layer corresponding to a plurality of sample transformed images in the encoder, the target viewing angle, and a background image; and a plurality of reference three-dimensional images.

10. The method according to claim 7, wherein the pre-training further comprises:

determining a first weight corresponding to the first loss function and a second weight corresponding to the second loss function;

determining a third loss function based on the first weight and the second weight; and adjusting at least one parameter of the third loss function.

11. An electronic device, comprising:

at least one processor; and memory coupled to the at least one processor and having instructions stored therein, wherein the instructions, when executed by the at least one processor, cause the electronic device to perform actions, the actions comprising:

receiving a first image presenting a target object at a first viewing angle, wherein the first image is a two-dimensional image;

determining a transformed image of the first image at a target viewing angle, wherein the target viewing angle is the same as or different from the first viewing angle, wherein determining the transformed image of the first image at the target viewing angle comprises generating a plurality of transformed images based on the first image utilizing a transformation group comprising a dihedral group, the dihedral group including rotation transformations at a plurality of angles and reflection transformations at a plurality of angles, the transformed image of the first image being determined based on the plurality of transformed images generated utilizing the transformation group comprising the dihedral group;

generating a first representation using a first feature extraction layer corresponding to the first viewing angle in an encoder based on the transformed image; and generating a second image based on the first representation, wherein the second image is a three-dimensional image and presents the target object at the target viewing angle.

12. The electronic device according to claim 11, wherein determining the transformed image of the first image further comprises:

determining a plurality of weights corresponding to the plurality of transformed images based on the target viewing angle; and determining the transformed image based on the plurality of transformed images and the plurality of weights.

13. The electronic device according to claim 11, wherein the rotation transformations at the plurality of angles comprise a plurality of rotation transformations that rotate the target object at different angles, respectively, and the reflection transformations at the plurality of angles comprise a plurality of reflection transformations that reflect the target object in different directions, respectively.

14. The electronic device according to claim 11, wherein the encoder further comprises a second feature extraction layer corresponding to a second viewing angle, a third feature extraction layer corresponding to a third viewing angle, and a fourth feature extraction layer corresponding to a fourth viewing angle, wherein the first viewing angle, the second viewing angle, the third viewing angle, and the fourth viewing angle are different from one another.

15. The electronic device according to claim 14, wherein the actions further comprise:

generating a second representation based on the first image and with the second feature extraction layer;

generating a third representation based on the first image and with the third feature extraction layer;

generating a fourth representation based on the first image and with the fourth feature extraction layer; and generating a fifth representation based on the first representation, the second representation, the third representation, and the fourth representation, and wherein generating the second image based on the first representation comprises:

generating the second image based on the fifth representation.

16. The electronic device according to claim 15, wherein the encoder is part of a group-equivariant convolutional neural network obtained via pre-training, and the first feature extraction layer, the second feature extraction layer, the third feature extraction layer, and the fourth feature extraction layer are respectively at least one layer in the group-equivariant convolutional neural network.

17. The electronic device according to claim 16, wherein the pre-training comprises:

determining, based on a set of sample two-dimensional images, a first loss function corresponding to the set of sample two-dimensional images with an inverse transformation network, wherein the first loss function represents a degree to which the encoder reserves relative transformations between multiple images at different viewing angles; and determining, based on the set of sample two-dimensional images, a second loss function corresponding to the set of sample two-dimensional images with a differentiable renderer, and the second loss function represents a matching degree of a generated plurality of training three- dimensional images and a plurality of reference three-dimensional images in terms of appearance similarity.

18. The electronic device according to claim 17, wherein the first loss function comprises a set of distances between respective ones of:

a plurality of training transformed images generated by the inverse transformation network and based on a plurality of representations determined by a feature extraction layer corresponding to a plurality of sample transformed images in the encoder; and a plurality of reference transformed images, and the second loss function comprises a set of distances between respective ones of:

a plurality of training three-dimensional images generated by the differentiable renderer and based on a plurality of representations generated by a feature extraction layer corresponding to a plurality of sample transformed images in the encoder, the target viewing angle, and a background image; and a plurality of reference three-dimensional images.

19. The electronic device according to claim 17, wherein the pre-training further comprises:

determining a first weight corresponding to the first loss function and a second weight corresponding to the second loss function;

determining a third loss function based on the first weight and the second weight; and adjusting at least one parameter of the third loss function.

20. A computer program product comprising a non-transitory computer-readable medium having computer-executable instructions stored therein, wherein the computer-executable instructions, when executed by a device, cause the device to perform actions, the actions comprising:

receiving a first image presenting a target object at a first viewing angle, wherein the first image is a two-dimensional image;

determining a transformed image of the first image at a target viewing angle, wherein the target viewing angle is the same as or different from the first viewing angle, wherein determining the transformed image of the first image at the target viewing angle comprises generating a plurality of transformed images based on the first image utilizing a transformation group comprising a dihedral group, the dihedral group including rotation transformations at a plurality of angles and reflection transformations at a plurality of angles, the transformed image of the first image being determined based on the plurality of transformed images generated utilizing the transformation group comprising the dihedral group;

generating a first representation using a first feature extraction layer corresponding to the first viewing angle in an encoder based on the transformed image; and generating a second image based on the first representation, wherein the second image is a three-dimensional image and presents the target object at the target viewing angle.

* * * * *